Oct. 24, 1939.  A. WAGNER  2,177,423
PULVERIZING DISK GANG TILLER ATTACHMENT
Filed Sept. 28, 1938  2 Sheets-Sheet 1

INVENTOR
ALBERT WAGNER

BY 
ATTORNEY

Oct. 24, 1939.   A. WAGNER   2,177,423

PULVERIZING DISK GANG TILLER ATTACHMENT

Filed Sept. 28, 1938   2 Sheets-Sheet 2

INVENTOR
ALBERT WAGNER
BY
ATTORNEY

Patented Oct. 24, 1939

2,177,423

UNITED STATES PATENT OFFICE 2,177,423

PULVERIZING DISK GANG TILLER ATTACHMENT

Albert Wagner, Churchbridge, Saskatchewan, Canada, assignor of one-half to Samuel Graff, Portland, Oreg.

Application September 28, 1938, Serial No. 232,043

3 Claims. (Cl. 97—53)

This invention relates generally to land travelling vehicles, and particularly to a pulverizing disk gang tiller attachment.

The main object of this invention is to construct an implement of the class described in which side draft will be completely eliminated thereby removing the wear and tear on the prime mover.

The second object is to construct an implement of the class described which will function in an improved manner as a weed exterminator.

The third object is to construct a vehicle of the class described whereby it will be possible to grow crops satisfactorily under comparatively severe drouth conditions.

The fourth object is to construct an implement of the class described which will serve to minimize soil drifting by depositing trash near or above the surface of the cultivated area.

The fifth object is to construct an implement of the class described which will thoroughly cultivate the seed bed down to the furrow soil without completely overturning the soil thereof in order that the fine particles of soil may not be exposed to direct action of the winds, which action is further prevented by the fact that the cultivated ground is left relatively smooth and the trash or stubble is kept near the surface of the ground and serves as a revetment.

I accomplish these and other objects in the manner set forth in the following specification as illustrated in the accompanying drawings, in which.

Similar numerals refer to similar parts throughout the several views.

Figure 1:
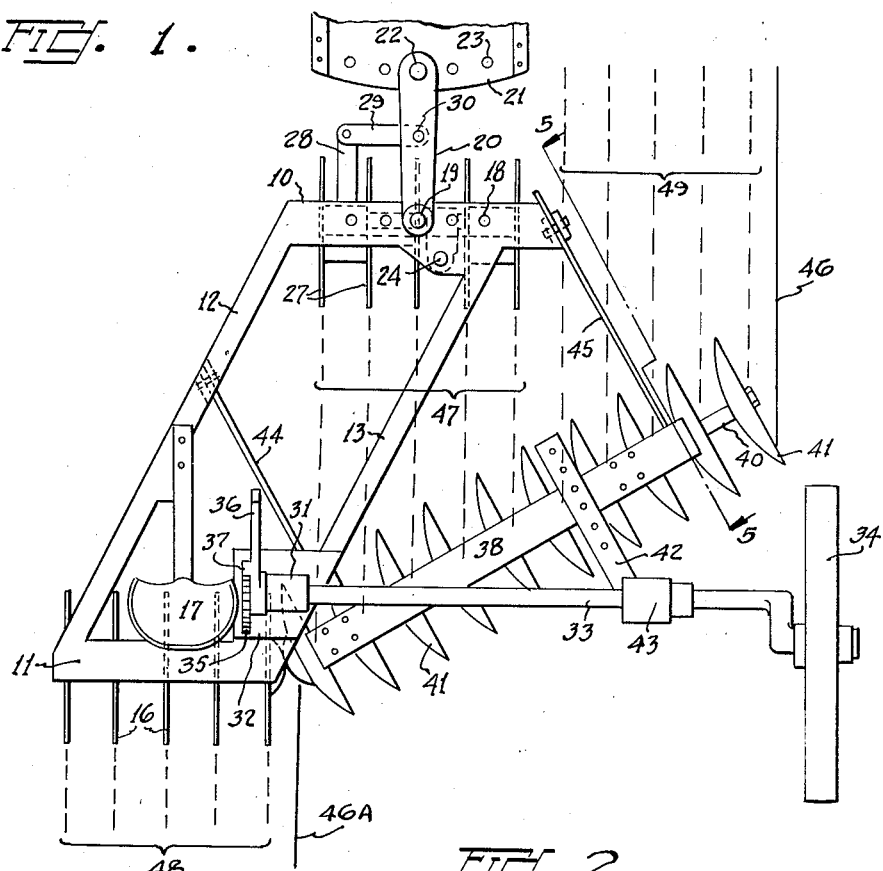
Fig. 1 is a plan of the complete implement.
Figure 2:
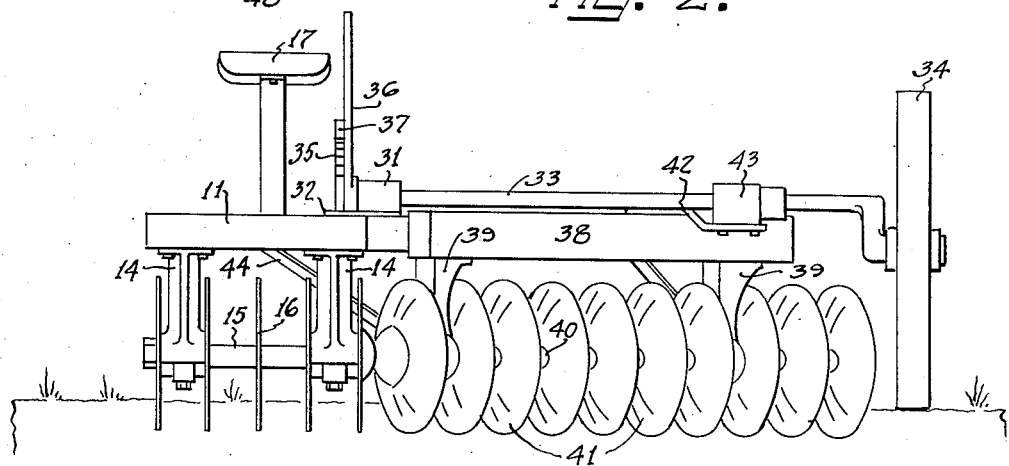
Fig. 2 is a rear elevation thereof.
Figure 2:
Figure 3:
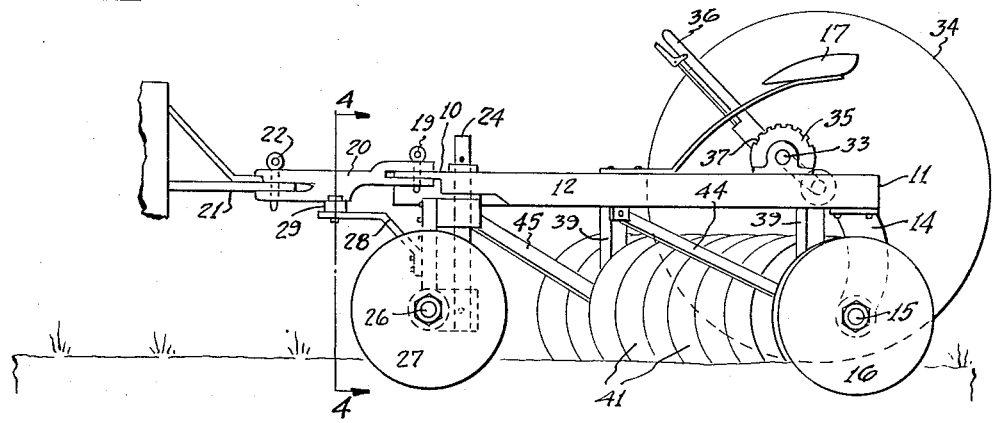
Fig. 3 is a side elevation of the implement.
Figure 4:
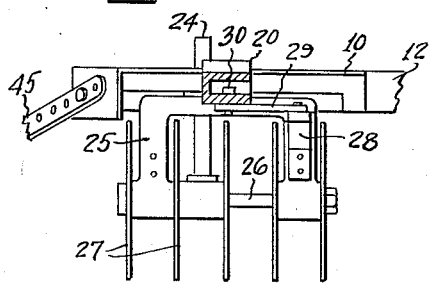
Fig. 4 is a vertical section taken along the line 4—4 in Fig. 3.
Figure 5:
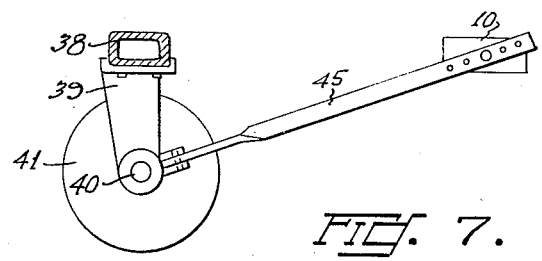
Fig. 5 is a vertical section taken along the line 5—5 in Fig. 1.
Figures 6, 8:
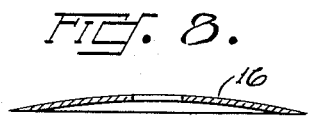
Fig. 6 is a perspective view of the side draft preventing vehicle.
Fig. 8 is a section through one of the side draft prevention disks.
Figure 7:
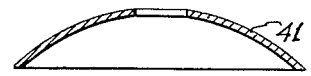
Fig. 7 is a section through one of the cultivating disks.

Referring in detail to the drawings, there is shown a frame consisting of the forward transverse bar 10 and the rearward transverse bar 11 which bars are joined by the diagonal bars 12 and 13. Under the rear bar 11 are disposed the standards 14 across whose lower ends journals the axle 15 on which are mounted the relatively flat disks 16 whose purpose it is to slice the top soil and cut through the stubble and trash from the previous growth.

A seat 17 is mounted on the diagonal bar 12 for the use of the operator.

The forward bar 10 is provided with a row of holes 18 adapted to receive the draw bar pin 19 by means of which the forward bar 10 is attached to the draw bar 20 which in turn is connected to the tractor frame 21 by means of the pin 22 which is adapted to occupy one of the holes 23 in the frame 21.

In the member 10 is also mounted the vertical spindle 24 on whose lower end is mounted the forked frame 25 in whose lower portion journals the axis 26 which occupies the relatively flat disks 27 which like the disks 16 are used to slice the soil and trash.

Attached to the forked frame 25 is an arm 28 which is connected by means of a link 29 to an intermediate portion of the draw bar 20 by means of a pin 30. The purpose of this construction is to provide a steering arrangement for the disks 27.

Journaling in the bearing 31 which rests upon the plate 32 on the diagonal bar 13 is a crank shaft 33 on whose outermost end is mounted a furrow wheel 34. On the plate 32 is formed the ratchet segment 35 which is concentric with the shaft 33. A hand lever 36 is secured to the shaft 33 and its pawl 37 is adapted to engage the ratchet segment 35 and hold the crank shaft 33 in a desired position.

Obviously, the shaft 33 may be additionally supported from the frame members 10 to 13, inclusive, if desired.

Under the crank shaft 33 is disposed a horizontal frame 38 from which extends downwardly the standards 39 across whose lower ends journals the gang disk shaft 40 on which are mounted the cultivating disks 41. Adjustably secured on the frame 38 is the horizontal bar 42 on which is secured the bearing 43 in which journals the crank shaft 33. The standards 39 are braced at their lower ends from the bar 12 by means of the connecting link 44 and from the bar 10 by means of the link 45.

In the operation of the device it is only necessary to provide a suitable tractor and attach the frame 21 to the bar 10 by means of the draw bar 20 and to set the crank shaft 33 in its desired position by means of the hand lever 36 which determines the depth of cultivation. As the implement proceeds with the wheel 34 in line with the furrow 46, the disks 27 slice the land along the dotted lines 47 as shown in Fig. 1 while the disks 16 slice the land along the dotted lines 48 as shown in Fig. 1.

It will be noted that the cultivating discs 41 cut directly behind the disks 27 which includes ground that has been sliced along the dotted lines 49 on a previous round by the disks 16 and also the land sliced by the disks 27 along the lines 47 on the same round. The line 46A represents the new furrow being formed.

The function of the discs 16 and 27 is to resist the side draft normally produced by the disking action of the disks 41 or their equivalents and also to slice the soil and trash in order to permit a more thorough functioning of the disks 41.

It can be seen from the foregoing that the disks 16 and 27 also serve to support the vehicle to which the disking attachment is secured while the actual weight is afforded by the furrow wheel 34.

In actual practice it is found that the side draft is almost completely eliminated thereby removing a large part of the wear on the tractor or other prime mover and at the same time the soil is thoroughly cultivated down to the furrow sole thereby eliminating air pockets and maintaining a moisture and nourishment connection to the subsoil whereby the plant growth is sustained until the roots reach the subsoil and are less affected by shortages of moisture above the top soil.

It is also important to note that in a plow of this type the soil is not only left level and smooth, but it is not turned over completely as is ordinarily the case, but is thoroughly stirred. This prevents the exposure of a large amount of moist soil to the drying action of the winds and also prevents the winds from carrying off the finer soil particles to the subsequent damage of the land and crops being grown thereon.

Owing to the fact that these advantages are inherent in the present implement, it is found practical to incorporate drills and seeding attachments directly upon the implement. Such a practice is, of course, not new and is not specifically claimed herein although it is especially advantageous to follow this practice when an implement of this type is employed.

I claim:

1. An implement of the class described consisting of a horizontal frame having a plurality of slicing disks for supporting the rearward end thereof and a plurality of steerable slicing disks for supporting the forward end thereof, a gang of cultivating disks adapted to be drawn from said frame and a crank shaft having a furrow engaging wheel at one end thereof and having its opposite end attached to said frame, said crank shaft having means for supporting said gang disks between the ends of said shaft.

2. In an implement of the class described, the combination of a horizontal frame having relatively flat slicing disks for supporting the rearward end thereof and relatively flat and steerable slicing disks for supporting the forward end thereof, a crank shaft having one end thereof mounted on said frame and having a wheel on the opposite end thereof adapted to ride in the furrow, said crank shaft having a bearing on the main axis of said shaft, a gang of cultivating disks supported from said bearing and drawn from said frame and means for adjusting the position of said crank shaft for the purpose of varying the elevation of said cultivating discs.

3. An implement of the class described having a frame consisting of transverse forward and rearward bars having diagonal connecting bars adapted to unite same into a rigid frame, said forward bar having a forked frame pivotally mounted under same and having a gang of slicing discs carried by said frame, a draw bar having connecting links for steering said forked frame, a plurality of slicing disks for supporting the rearward end of said frame to the left of said first mentioned disc, a set of cultivating disks disposed to the right of said rearmost disks directly behind said foremost disks and extending diagonally to the right thereof and means for controlling the cutting depth of said cultivating disks.

ALBERT WAGNER.